(12) United States Patent
Barbee et al.

(10) Patent No.: US 8,091,034 B2
(45) Date of Patent: Jan. 3, 2012

(54) TIERED WEB CONFERENCE

(75) Inventors: Terry W. Barbee, Durham, NC (US);
Jeffrey R. Hoy, Red Springs, NC (US);
Molly F. Levenson, Apex, NC (US);
Cynthia J. Rainey, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 12/243,234

(22) Filed: Oct. 1, 2008

(65) Prior Publication Data
US 2010/0083118 A1     Apr. 1, 2010

(51) Int. Cl.
*G06F 15/00* (2006.01)
*G06F 13/00* (2006.01)

(52) U.S. Cl. ........................ 715/751; 715/753

(58) Field of Classification Search .......... 715/763–765, 715/810, 781, 851–853, 734–740, 751, 753, 715/758
See application file for complete search history.

(56) References Cited

U.S. PATENT DOCUMENTS

| | | | |
|---|---|---|---|
| 2006/0031779 A1* | 2/2006 | Theurer et al. | 715/781 |
| 2009/0210822 A1* | 8/2009 | Schindler | 715/810 |

\* cited by examiner

*Primary Examiner* — Cao "Kevin" Nguyen
(74) *Attorney, Agent, or Firm* — DeLizio Gilliam, PLLC

(57) ABSTRACT

In a tiered web conference method and system, a presenter is able to add material of the presenter's presentation to the material of another presenter's presentation in real-time and is able to broadcast both presentations to a targeted audience. In one embodiment, a method includes receiving a secondary presentation that adds material to an original presentation, wherein the original presentation is provided by a first user, and the secondary presentation is provided by a second user; and displaying the original presentation and the secondary presentation simultaneously to a target group of viewers.

21 Claims, 5 Drawing Sheets

```
┌─────────────────────────────────┐
│  Receive a secondary presentation │
│  that adds material to an original│
│          presentation             │
│              200                  │
└─────────────────────────────────┘
                │
                ▼
┌─────────────────────────────────┐
│  Display the original presentation│
│  and the secondary presentation   │
│  simultaneously to a target group │
│            of viewers             │
│              202                  │
└─────────────────────────────────┘
```

TIERED WEB CONFERENCE

BACKGROUND OF THE INVENTION

A web conference is a means for conducting a live meeting or presentation over a network, where attendees attend the web conference on their own computers. A presenter typically speaks over a telephone line or via the network using Voice over Internet Protocol (VoIP) and uses a mouse to point to presentation material displayed on the computer screens of the attendees. A problem with conventional web conferencing is that the material provided in a given presentation may not be relevant or understandable to all attendees. This may be the case, for example, where a web conference is presented to a large, diverse audience of different backgrounds such as to the employees of a large multinational corporation.

BRIEF SUMMARY OF THE INVENTION

In a tiered web conference method and system, a presenter is able to add material of the presenter's presentation to the material of another presenter's presentation in real-time, and is able to broadcast both presentations to a targeted audience. In one embodiment, a method includes receiving a secondary presentation that adds material to an original presentation, wherein the original presentation is provided by a first user, and the secondary presentation is provided by a second user; and displaying the original presentation and the secondary presentation simultaneously to a target group of viewers.

BRIEF DESCRIPTION OF THE DRAWINGS

FIG. 2 is a diagram illustrating a process for providing a second tier of a tiered web conference according to an exemplary embodiment.

DETAILED DESCRIPTION OF THE INVENTION

The present invention relates to a method for providing presentations to users. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In a tiered web conference, the exemplary embodiment enables a presenter to add material of the presenter's presentation to the material of another presenter's presentation in real-time, and to broadcast both presentations to a targeted audience. In other words, a presenter can add contextual content to another presenter's presentation, thereby expanding the original presentation. Also, attendees may connect to the expanded presentation rather than the original.

Figure 1:
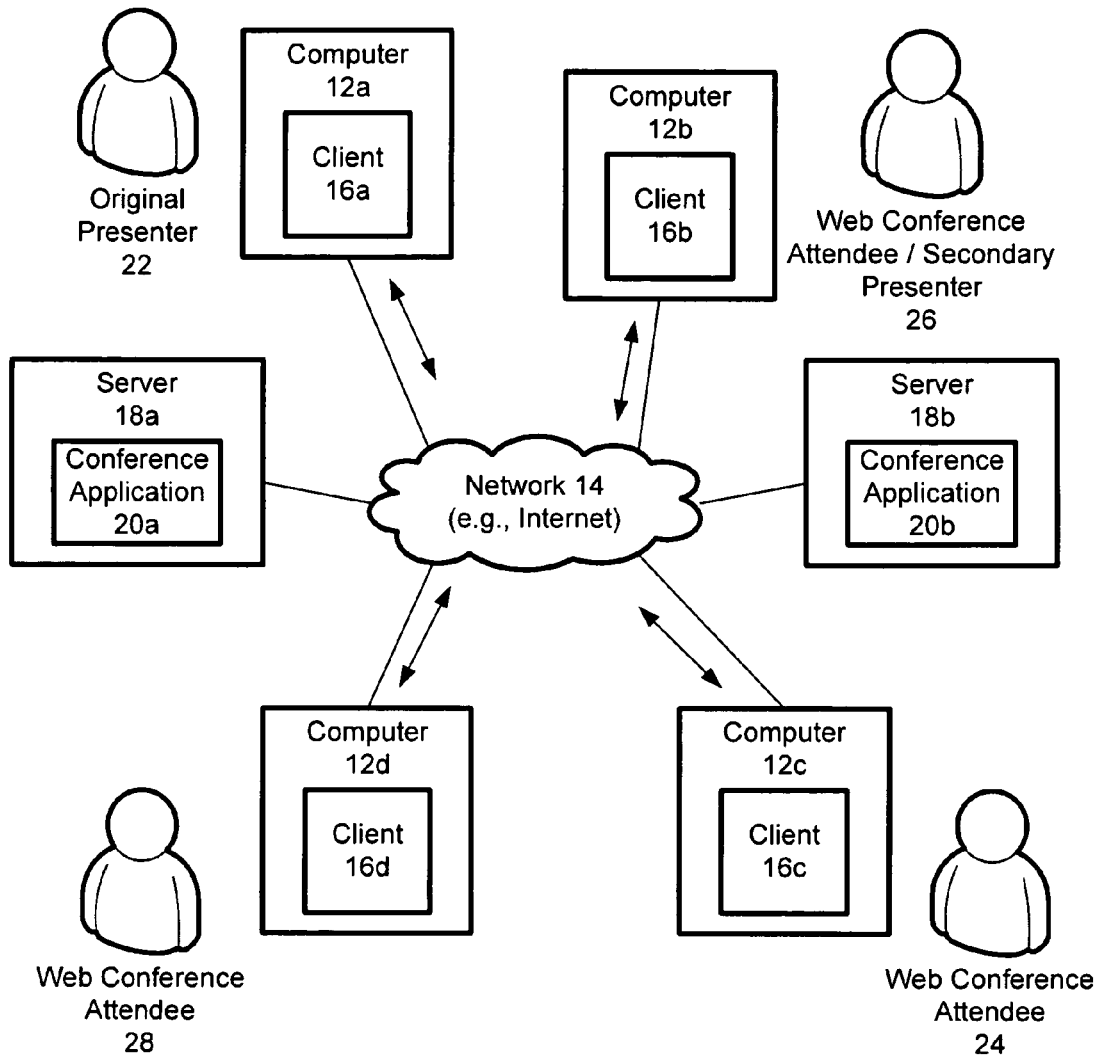
FIG. 1 is a logical block diagram illustrating an exemplary network system environment in which one embodiment of the present invention may be implemented for providing tiered web conferencing.

FIG. 1 is a logical block diagram illustrating an exemplary network system environment 10 in which one embodiment of the present invention may be implemented for providing tiered web conferencing. A network system environment 10 is shown in which two or more computers 12a, 12b, 12c, and 12d, communicate over a network 14. The network 14 may be a public network, such as the Internet, or a private network, such as an intranet, LAN, or WLAN, or a combination thereof. At least a portion of the computers 12a-d may execute respective clients 16a, 16b, 16c, and 16d that enable the computers 12a-d to communicate with each other via one or more servers 18a and 18b.

In one embodiment, conference applications 20a and 20b reside on servers 18a-b, respectively. The conference applications 20a-b may be stored in respective memories residing on or associated with servers 18a-b or on any other suitable storage location or computer-readable medium. The conference applications 20a-b provide instructions that when executed by processors of the servers 18a-b perform the functions described herein. In an alternative embodiment, the conference applications may also reside on the computers 12a-d, and may be separate from respective clients 16a-d or may be extensions of respective clients 16a-d. In one embodiment, each the conference applications 20a-b enables one or more users to present information, or material, to one or more other users in a web conference. The presented material may include information in a variety of formats. For example, the information may include a combination of text, voice, digital images, video, etc. For ease of illustration, the embodiments below are described in terms of the conference application 20a performing the web conference functions for different web conference presenters. In alternative embodiments, either or both of the conference applications 20a and 20b may perform the web conference functions for different web conference presenters.

As described in more detail below, during a tiered web conference, one user (e.g., original presenter 22) may present material to one or more other users (e.g., web conference attendee 24, web conference attendee/secondary presenter 26, etc.). Note that web conference attendee 26 may also be referred to as secondary presenter 26, because any given web conference attendee may also be a secondary presenter. For example, in a second tier of the web conference, another user (e.g., secondary presenter 26) may present material to one or more other users (e.g., web conference attendee 28). For ease of illustration, only web conference attendees 24, 26, and 28 are shown. However, the web conference attendees 24 and 28 may represent multiple web conference attendees (e.g., employees of a corporation).

The following embodiment is a process for providing a tiered web conference according to an exemplary embodiment. Initially, the conference application 20a broadcasts an original presentation to a first group of users. In one embodiment, the original presentation is provided by the client 16a of a first user, which may also be referred to as the original presenter 22. The web conference material of the original presentation is displayed on the respective monitors of the first group of users, which may include web conference attendees 24 and 26.

After the tiered web conference is initiated, the conference application 20a may initiate a second tier of the web conference, where the conference application 20a broadcasts the original presentation to a second group of users and simultaneously broadcasts a secondary presentation to the second group of users.

FIG. 2 is a diagram illustrating a process for providing a second tier of a tiered web conference according to an exemplary embodiment. The process may begin by the conference application 20a receiving a secondary presentation that adds material to an original presentation (block 200). As described above, the original presentation is provided by the client 16a of the original presenter 22. In one embodiment, the secondary presentation is provided by the client 16b of a second user, which may also be referred to the secondary presenter 26 (e.g., a user other than the original presenter 22). Referring briefly to FIG. 1, note that the secondary presenter 26 may also be referred to as a web conference attendee 26 who views the original presentation. The web conference material associated with the original presentation and the web conference material of the secondary presentation is displayed on the respective monitors of the second group of users, which may include web conference attendee 28.

The conference application 20a then displays the original presentation and the secondary presentation simultaneously to a second group of users, which may also be referred to as a target group of viewers (block 202). In one embodiment, the conference application 20a broadcasts the original presentation and the secondary presentation simultaneously. In one embodiment, the conference application 20a enables the secondary user to control access to the secondary presentation combined with the original presentation.

In one embodiment, the conference application 20a enables the secondary presenter 26 to restrict access to the broadcasting of the original presentation and the broadcasting of the secondary presentation. For example, the secondary presenter 26 may restrict access to a single department of employees.

Figure 3:
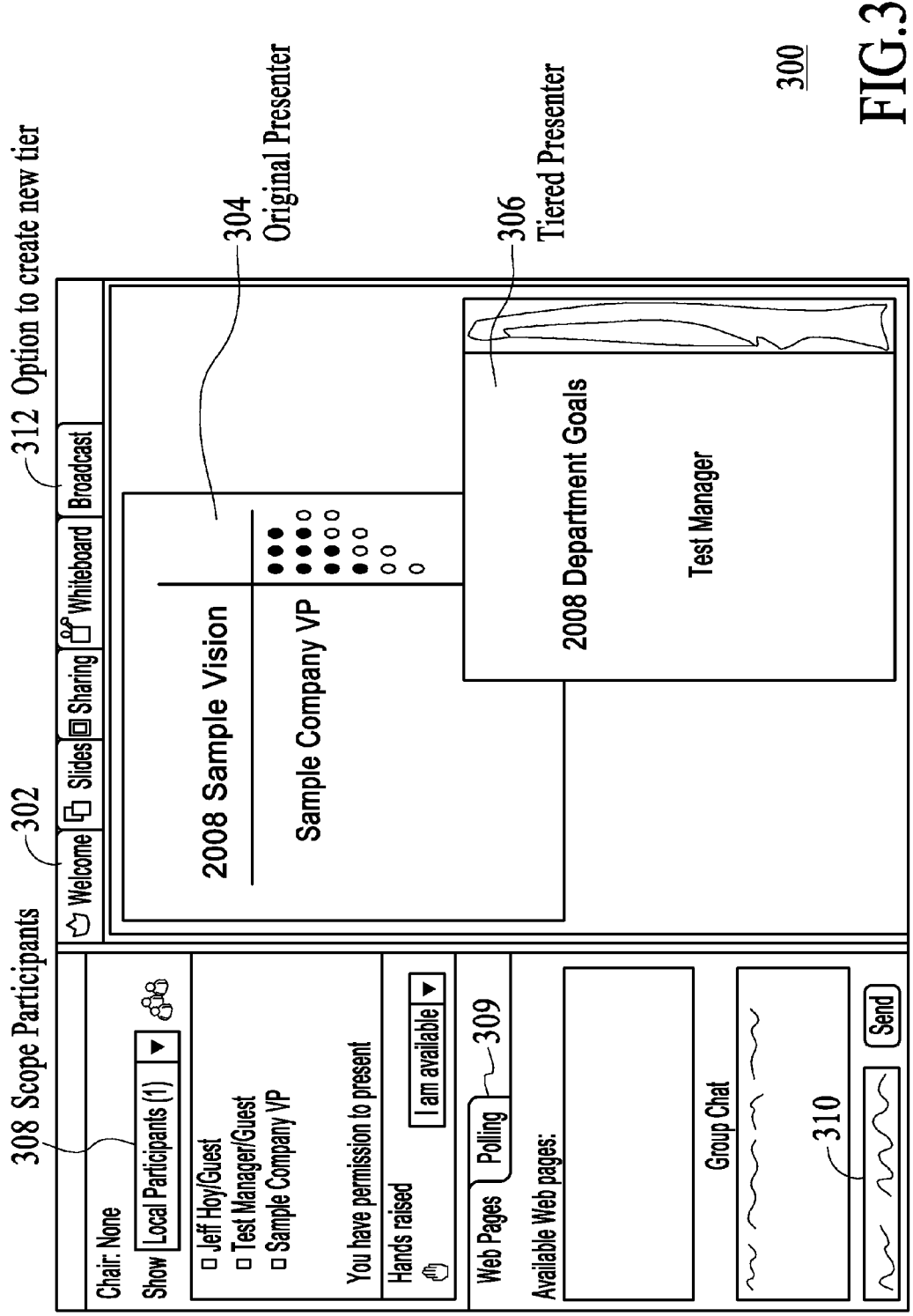
FIG. 3 is a diagram illustrating an example set of windows displayed during a tiered web conference according to an exemplary embodiment.

FIG. 3 is a diagram illustrating an example set of windows 300 displayed during a tiered web conference according to an exemplary embodiment. These windows are displayed on the monitors associated with the computers 12 of the original presenter 22, any secondary presenter 26, and any web conference attendee(s) 24. FIG. 3 shows a main web conference window 302 that displays material 304 from a given presenter (e.g., the original presenter 22) and displays material 306 from another presenter (e.g., the secondary presenter 26. The set of windows of FIG. 3 may also include a window 308 showing the web conference participants, and a window 309 showing polling options, a group chat window 310 that displays text exchanged among the participants during the web conference.

The "broadcast" option (button 312) enables the user to become a web conference presenter in addition to being an attendee. In one embodiment, a new web conference tier may be implemented either by the conference application 20a having the user present using new server (e.g., server 18b shown in FIG. 1) or automatically having the user present using the original server 18a. Using multiple servers has a benefit of reducing bandwidth on the original server and improving latency, similar to Internet Protocol (IP) multicasting.

Figure 4:
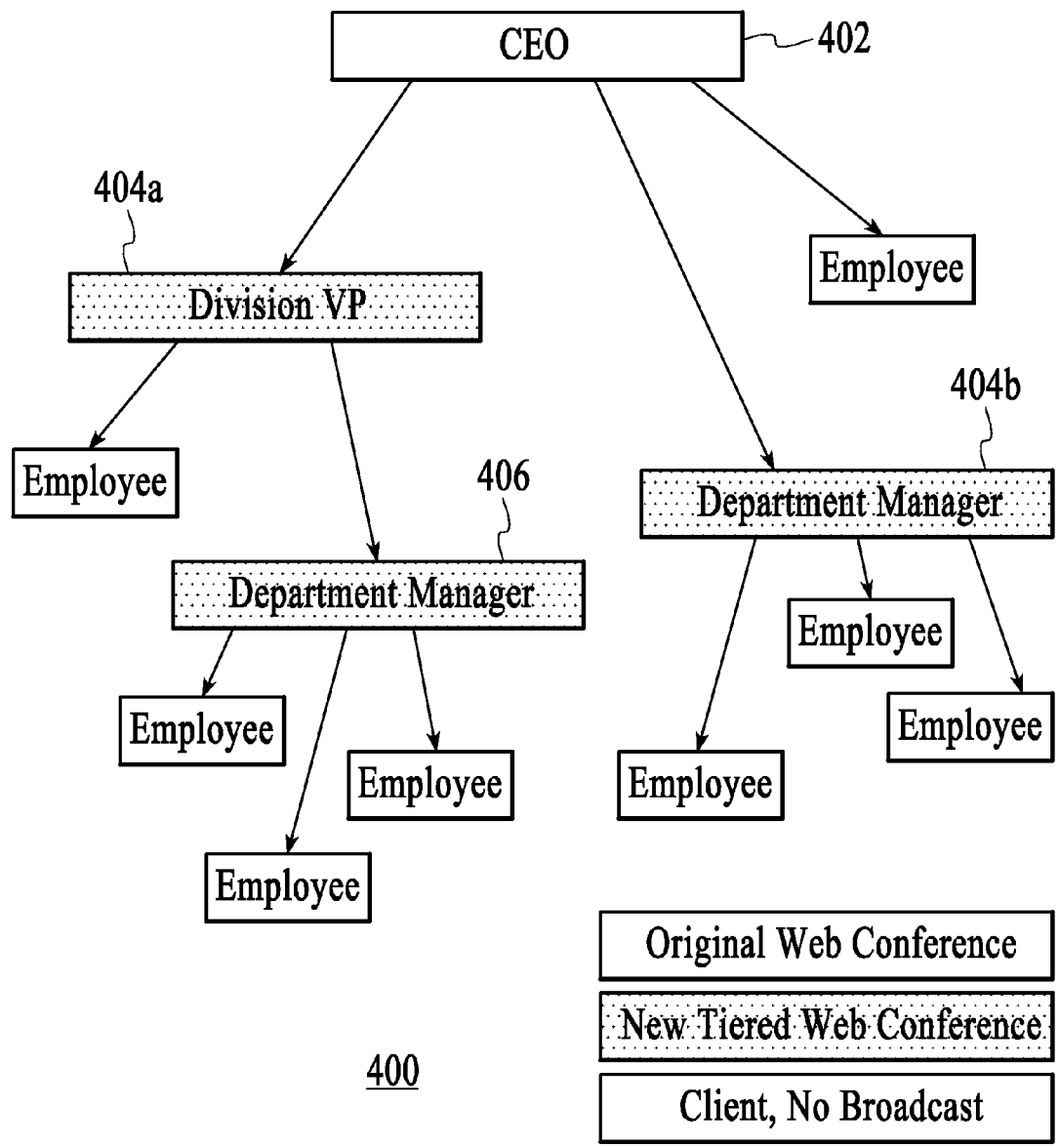
FIG. 4 is an example organizational chart of tiered web conference participants according to an exemplary embodiment.

FIG. 4 is an example organizational chart 400 of tiered web conference participants according to an exemplary embodiment. As FIG. 4 shows, a CEO 402 of a large multinational corporation may hold a general web conference for all employees. Particular attendees such as a division vice president 404a and a department manager 404b may choose to broadcast the original presentation to employees in their respective organizations. As described above, the division vice president 404a and a department manager 404b may present a version of the web conference with added material relevant to their respective organizations. Such material may provide additional information or may clarify information in the original presentation. In one embodiment, the presentations of the division vice president 404a and a department manager 404b are provided by the clients on their respective computers. Employees would then connect to their respective manager's web conference instead of the original. The presentations of the division vice president 404a and a department manager 404b may be referred to as a second tier of the web conference or as a second-tier web conference. In one embodiment, an attendee of the second tier (e.g., department manager 406) may in turn choose to broadcast the presentation viewed by that attendee to employees in that attendee's organization. This presentation may be referred to as a tertiary presentation, which is a part of a third tier of the web conference or a third-tier web conference. In particular embodiments, there may be multiple second-tier and third-tier web conferences, one or more fourth-tier web conferences, etc. Employees would then connect to the third tier instead of the original or any other tier. In one embodiment, the presentation of the department manager 406 is provided by the client on the computer of the department manager 406. In one embodiment, the conference application 20a enables any given presenter (e.g., division vice president 404a, department manager 404b, department manager 406, etc.) regardless of which tier (e.g., first tier, second tier, third tier, fourth tier, etc) to control access to the presenter's respective presentation combined with the original presentation. It may be possible, for example, for an attendee of a third tier web conference (e.g., department manager 406) to be a part of the original group of users that view the original presentation, depending on which users the original presenter 22 allows access.

Figure 5:
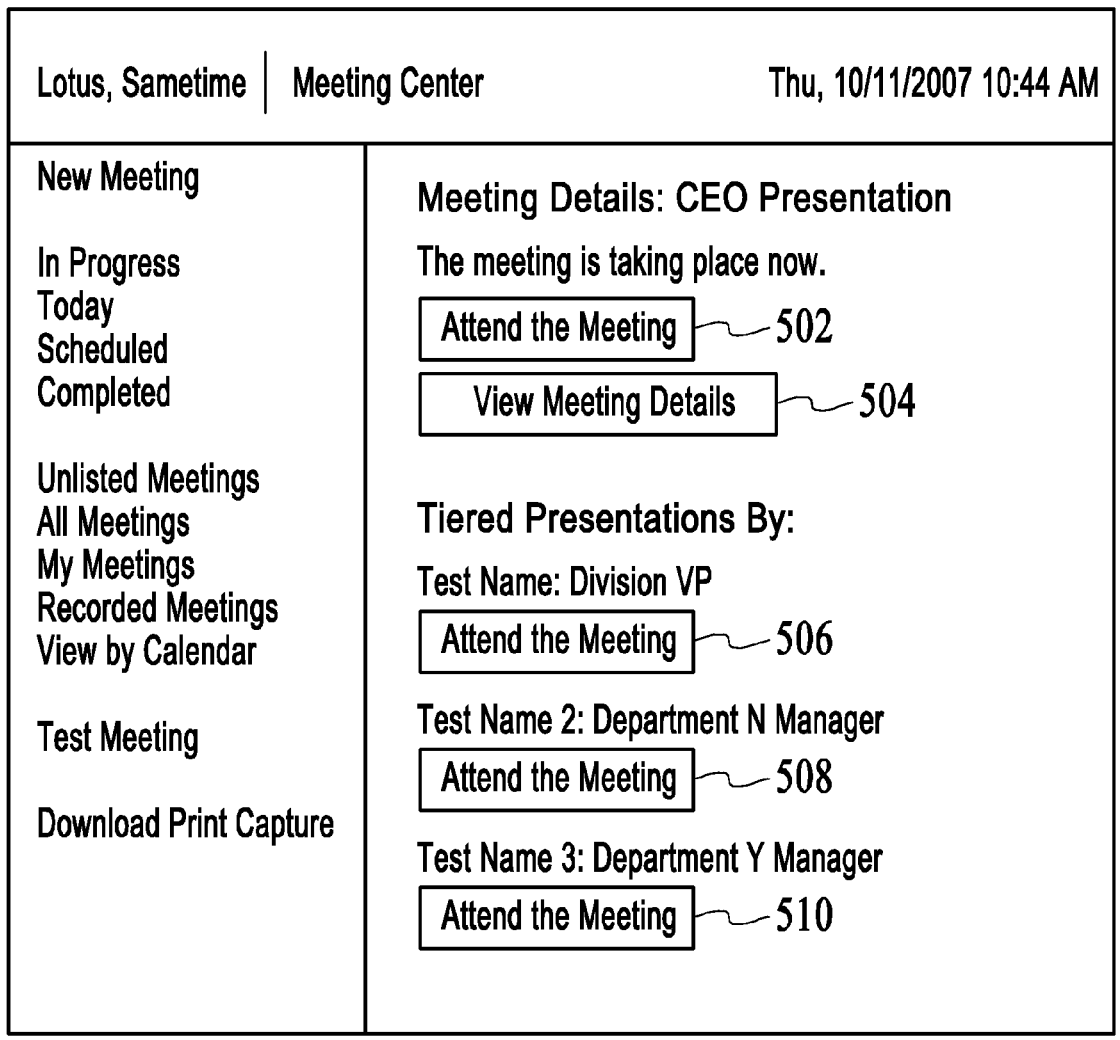
FIG. 5 is an example view showing options for a user to join a tiered web conference.

FIG. 5 is an example view showing options for a user to join a tiered web conference. As FIG. 5 shows, in one embodiment, a user may select a button 502 in order to join an original presentation (e.g., given by the CEO) and may select another button 504 to view details (e.g., materials) from the original meeting. The user may also select other buttons 506, 508, or 510 to join new tiered web conferences given by other users of particular departments, in which case the user would see expanded versions of the original presentation.

According to the system and method disclosed herein, the present invention provides numerous benefits. For example, embodiments of the present invention provides tiered web conferences that enable particular attendees to add material to a given presentation. Embodiments of the present invention may also reduce the network load on the original web conference server and to reduce overall network usage.

A method and system for providing presentations to users has been disclosed. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for providing presentations to a number of attendees of a multi-tiered web conference, the method comprising:
   receiving, by a device of an attendee of the number of attendees who is a manager of a subgroup of attendees of the number of attendees, an original presentation for a first tier of the multi-tiered web conference from a device of an original presenter
   creating, based on input from the attendee who is a manager of the subgroup of attendees, a secondary presentation, a secondary presentation for a second tier of the multi-tiered web conference, the secondary presentation comprising the original presentation and added material;
   transmitting, from the device of the attendee to devices of the subgroup of attendees managed by the attendee based on a request to connect by the devices of the subgroup of attendees, the secondary presentation for viewing by the subgroup of attendees as part of the second tier of the multi-tiered web conference instead of the first tier; and
   displaying, at the device of the attendee for viewing by the attendee during the multi-tiered web conference, at least one of the original presentation for the first tier and the secondary presentation for the second tier, wherein the other attendees of the multi-tiered web conference are to view the original presentation of the first tier unless a different secondary presentation for the second tier is provided for their viewing during the multi-tiered web conference.

2. The method of claim 1 further comprising enabling the attendee to control access to the secondary presentation combined with the original presentation.

3. The method of claim 1 further comprising displaying the original presentation and a tertiary presentation simultaneously to a third group of viewers, wherein the tertiary presentation is provided by a different attendee.

4. The method of claim 3 further comprising enabling the different attendee to control access to the tertiary presentation combined with the original presentation.

5. The method of claim 3 wherein the original presentation is displayed to a first group of viewers, and wherein the first group of viewers comprises the different attendee.

6. The method of claim 1, further comprising:
   receiving, by a device of a different attendee of the number of attendees, the original presentation for the first tier of the multi-tiered web conference from a device of an original presenter;
   creating, based on input from the different attendee a secondary presentation, a different secondary presentation for the second tier of the multi-tiered web conference, the different secondary presentation comprising the original presentation and different added material;
   displaying, at the device of the different attendee, the different secondary presentation for viewing by the different attendee; and
   creating a third-tier of the multi-tiered web conference based on broadcasting, from the device of the different attendee to devices of a different subgroup of attendees, the viewing of the different secondary presentation being viewed by the different attendee.

7. The method of claim 1, wherein the added material is for clarification of the original presentation for the subgroup of attendees.

8. An executable software product stored on a computer-readable medium containing program instructions for providing presentations to a number of attendees of a multi-tiered web conference, the program instructions for:
   receiving, by a device of an attendee of the number of attendees who is a manager of a subgroup of attendees of the number of attendees, an original presentation for a first tier of the multi-tiered web conference from a device of an original presenter
   creating, based on input from the attendee who is a manager of the subgroup of attendees, a secondary presentation, a secondary presentation for a second tier of the multi-tiered web conference, the secondary presentation comprising the original presentation and added material;
   transmitting, from the device of the attendee to devices of the subgroup of attendees managed by the attendee based on a request to connect by the devices of the subgroup of attendees, the secondary presentation for viewing by the subgroup of attendees as part of the second tier of the multi-tiered web conference instead of the first tier; and
   displaying, at the device of the attendee for viewing by the attendee during the multi-tiered web conference, at least one of the original presentation for the first tier and the secondary presentation for the second tier, wherein the other attendees of the multi-tiered web conference are to view the original presentation of the first tier unless a different secondary presentation for the second tier is provided for their viewing during the multi-tiered web conference.

9. The executable software product of claim 8 further comprising program instructions for enabling the attendee to control access to the secondary presentation combined with the original presentation.

10. The executable software product of claim 8 further comprising program instructions for displaying the original presentation and a tertiary presentation simultaneously to a third group of viewers, wherein the tertiary presentation is provided by a different attendee.

11. The executable software product of claim 10 further comprising program instructions for enabling the different attendee to control access to the tertiary presentation combined with the original presentation.

12. The executable software product of claim 10 wherein the original presentation is displayed to a first group of viewers, and wherein the first group of viewers comprises the different attendee.

13. The executable software product of claim 8, further comprising program instructions for:
receiving, by a device of a different attendee of the number of attendees, the original presentation for the first tier of the multi-tiered web conference from a device of an original presenter;
creating, based on input from the different attendee a secondary presentation, a different secondary presentation for the second tier of the multi-tiered web conference, the different secondary presentation comprising the original presentation and different added material;
displaying, at the device of the different attendee, the different secondary presentation for viewing by the different attendee; and
creating a third-tier of the multi-tiered web conference based on broadcasting, from the device of the different attendee to devices of a different subgroup of attendees, the viewing of the different secondary presentation being viewed by the different attendee.

14. The executable software product of claim 8, wherein the added material is for clarification of the original presentation for the subgroup of attendees.

15. A system comprising:
a server; and
an application configured to execute on the server, which when executed causes the server to perform functions for:
receiving, by an attendee of the number of attendees who is a manager of a subgroup of attendees of the number of attendees, an original presentation for a first tier of the multi-tiered web conference from a device of an original presenter
creating, based on input from the attendee who is a manager of the subgroup of attendees, a secondary presentation, a secondary presentation for a second tier of the multi-tiered web conference, the secondary presentation comprising the original presentation and added material;
transmitting, to devices of the subgroup of attendees managed by the attendee based on a request to connect by the devices of the subgroup of attendees, the secondary presentation for viewing by the subgroup of attendees as part of the second tier of the multi-tiered web conference instead of the first tier; and
displaying, for viewing by the attendee during the multi-tiered web conference, at least one of the original presentation for the first tier and the secondary presentation for the second tier, wherein the other attendees of the multi-tiered web conference are to view the original presentation of the first tier unless a different secondary presentation for the second tier is provided for their viewing during the multi-tiered web conference.

16. The system of claim 15 wherein, in response to execution of the application, the server is configured to further perform functions for enabling the attendee to control access to the secondary presentation combined with the original presentation.

17. The system of claim 15 wherein, in response to execution of the application, the server is configured to further perform functions for displaying the original presentation and a tertiary presentation simultaneously to a third group of viewers, wherein the tertiary presentation is provided by a different attendee.

18. The system of claim 17 wherein, in response to execution of the application, the server is configured to further perform functions for enabling the different attendee to control access to the tertiary presentation combined with the original presentation.

19. The system of claim 17 wherein the original presentation is displayed to a first group of viewers, and wherein the first group of viewers comprises the different attendee.

20. The system of claim 15, further comprising:
a different application configured to execute on at least one of the server and a different server, which when executed causes the at least one of the server and the different server to perform functions for:
receiving, by a different attendee of the number of attendees, the original presentation for the first tier of the multi-tiered web conference from a device of an original presenter;
creating, based on input from the different attendee a secondary presentation, a different secondary presentation for the second tier of the multi-tiered web conference, the different secondary presentation comprising the original presentation and different added material;
displaying the different secondary presentation for viewing by the different attendee; and
creating a third-tier of the multi-tiered web conference based on broadcasting, from the at least one server and the different server to a different subgroup of attendees, the viewing of the different secondary presentation being viewed by the different attendee.

21. The system of claim 15, wherein the added material is for clarification of the original presentation for the subgroup of attendees.

* * * * *